US012153379B2

(12) United States Patent
Cattaneo et al.

(10) Patent No.: US 12,153,379 B2
(45) Date of Patent: Nov. 26, 2024

(54) HOROLOGICAL MECHANISM WITH COUNTING CHAIN

(71) Applicant: ROLEX SA, Geneva (CH)

(72) Inventors: Julien Cattaneo, Reignier-Esery (FR); Pierre-Alain Graemiger, Trélex (CH)

(73) Assignee: ROLEX SA, Geneva (CH)

( * ) Notice: Subject to any disclaimer, the term of this patent is extended or adjusted under 35 U.S.C. 154(b) by 623 days.

(21) Appl. No.: 17/378,885

(22) Filed: Jul. 19, 2021

(65) Prior Publication Data

US 2022/0026851 A1 Jan. 27, 2022

(30) Foreign Application Priority Data

Jul. 21, 2020 (EP) .................................... 20186888

(51) Int. Cl.
*G04B 13/02* (2006.01)
*G04D 3/00* (2006.01)

(52) U.S. Cl.
CPC ............ *G04B 13/02* (2013.01); *G04D 3/002* (2013.01)

(58) Field of Classification Search
CPC ................................ G04B 13/02; G04D 3/002
USPC ........................................................ 368/220
See application file for complete search history.

(56) References Cited

U.S. PATENT DOCUMENTS

| | | | | |
|---|---|---|---|---|
| 2,066,357 A | | 1/1937 | McDonald | |
| 2,325,539 A | | 7/1943 | Pfister | |
| 4,182,114 A | | 1/1980 | Gagnebin | |
| 4,711,583 A | | 12/1987 | Oechslin et al. | |
| 5,793,708 A | * | 8/1998 | Schmidt | G04F 7/0814 368/110 |
| 5,798,986 A | | 8/1998 | Tzeng | |
| 2012/0269044 A1 | | 10/2012 | Bas et al. | |
| 2016/0246256 A1 | * | 8/2016 | Zaugg | G04B 1/105 |
| 2018/0120770 A1 | * | 5/2018 | Breuilh | G04B 13/02 |

FOREIGN PATENT DOCUMENTS

| | | | | | |
|---|---|---|---|---|---|
| CH | 698906 | A2 | | 11/2009 | |
| CH | 709162 | A2 | * | 7/2015 | G04B 11/00 |
| CH | 710362 | A1 | * | 5/2016 | G04B 13/008 |
| CH | 713780 | A2 | * | 11/2018 | G04B 1/22 |
| CN | 108037653 | A | | 5/2018 | |
| DE | 2744891 | A1 | | 4/1978 | |
| EP | 0195742 | A1 | | 9/1986 | |
| EP | 0772104 | A1 | | 5/1997 | |
| EP | 2515186 | A1 | | 10/2012 | |
| EP | 3368950 | | | 9/2018 | |
| FR | 815777 | A | | 7/1937 | |
| FR | 2358695 | A1 | | 2/1978 | |
| WO | 2017071887 | A1 | | 5/2017 | |

OTHER PUBLICATIONS

European Search Report and Written Opinion dated Mar. 25, 2021 in priority application No. EP20186888.2; with English machine translation (total 21 pages).

* cited by examiner

*Primary Examiner* — Edwin A. Leon
*Assistant Examiner* — Kevin Andrew Johnston
(74) *Attorney, Agent, or Firm* — Seckel IP, PLLC

(57) ABSTRACT

A horological mechanism (110), notably a horological movement or chronograph module,
including a counting chain (100) having an epicycloidal train (31, 32, 33, 34) including a first sun wheel (33) fixed to the frame.

23 Claims, 6 Drawing Sheets

I-I

HOROLOGICAL MECHANISM WITH COUNTING CHAIN

This application claims priority of European patent application No. EP20186888.2 filed Jul. 21, 2020, the content of which is hereby incorporated by reference herein in its entirety.

The invention relates to a horological mechanism. The invention relates also to a timepiece comprising such a mechanism. The invention also relates to a method for mounting such a mechanism.

The document EP2515186 describes the arrangement of an epicycloidal train in a finishing gear train, in order to reduce the number of mobiles and thus increase the efficiency of the transmission. A barrel drives this epicycloidal train by the planetary wheel-holder. The planetary wheel or planetary wheels mounted on the planetary wheel-holder mesh simultaneously with a first sun wheel fixed to the frame of the movement and with a second sun wheel. This second sun wheel comprises a wheel linked kinematically to the escapement pinion.

The document EP0195742 describes an astronomical watch comprising an epicycloidal train, which makes it possible to achieve the transmission ratios necessary to display at least one astronomical quantity. A first sun wheel and the planetary wheel-holder are driven by basic movement. The other sun wheels driven by different planetary wheel gears and gear trains, borne by the planetary wheel-holder, make it possible to implement the display of different astronomical temporal quantities.

The document EP3368950 describes a chronograph mechanism with downcounting, which makes it possible to reverse the direction of rotation of the chronograph seconds display according to the display mode of the chronograph. More specifically, when a downcount is programmed by the user, the chronograph seconds display turns in the counter-clockwise direction then, at the end of the downcount, the direction of rotation of the chronograph seconds display reverses automatically to turn in the conventional direction. To achieve this, an epicycloidal train is arranged upstream of a clutch device which makes it possible to kinematically link the finishing gear train to the chronograph counting chain. This epicycloidal train comprises a first sun wheel driven by the finishing gear train, a second sun wheel intended to drive the chronograph seconds mobile via the clutch device, and a planetary wheel-holder comprising a planetary wheel, meshing simultaneously with said sun wheels. The planetary wheel-holder is intended to be stopped by a downcounting mechanism according to the chronograph display mode. In other words, the direction of rotation of the chronograph seconds display is a function of the rotation movement of the planetary wheel-holder.

The document EP0772104 discloses a chronograph counting chain architecture. This counting chain links a mobile of the chronograph hours counter to a mobile of the chronograph minutes counter. The latter is driven by one step per minute by a finger included in a chronograph clutch mobile. This architecture implements very few mobiles, which makes it possible to obtain a good efficiency by comparison with the counting chains known from the state of the art while exhibiting a relatively small bulk. Furthermore, it also results in little meshing play which can be controlled by a single indexing device for all of the counting chain.

For chronometric measurement accuracy and performance considerations, the chronograph counting chains are generally engaged with the seconds mobile of the finishing gear train chain of the basic movement, through a clutch device. Now, by starting from the seconds mobile which performs one revolution per minute, the gear reduction necessary to obtain a "12-hour" display (one revolution in 12 hours) is 720 and 1440 for a "24-hour" display (one revolution in 24 hours).

To achieve such a gear reduction, numerous mobiles must be arranged in the counting chain, which presents a not-inconsiderable bulk in a horological movement, notably in a chronograph module. Moreover, the movement blanks provided for pivoting the mobiles of such a counting chain have difficulty in pivoting the mobiles of a counting chain in which the gear reduction is lesser. That means developing movement blanks for pivoting the display mobiles over 12 hours and developing other movement blanks for pivoting the display mobiles over 24 hours.

The aim of the invention is to provide a horological mechanism that makes it possible to improve the devices known from the prior art. In particular, the invention proposes a horological mechanism that makes it possible to achieve a significant gear reduction with a limited bulk. The invention also proposes a mounting method that makes it possible to use the same movement blanks to produce a horological mechanism that allows a chronograph display over 12 hours or over 24 hours.

A mechanism according to the invention is defined by point 1 below.

1. A horological mechanism, notably a horological movement or chronograph module, comprising:
   a frame, and
   a counting chain, comprising an epicycloidal train including a first sun wheel fixed to the frame.

Different embodiments of the mechanism are defined by points 2 to 11 below.

2. The horological mechanism as defined in point 1, wherein the mechanism comprises a clutch device arranged upstream of the counting chain to mechanically link a finishing gear train to the counting chain.
3. The horological mechanism as defined in the preceding point, wherein the clutch device comprises a vertical clutch mobile.
4. The horological mechanism as defined in one of the preceding points, wherein the epicycloidal train comprises a second output sun wheel of the epicycloidal train arranged so as to drive, by meshing, directly or indirectly, a counter of the counting chain.
5. The horological mechanism as defined in the preceding point, wherein the second sun wheel is arranged so as to drive, by meshing, directly or indirectly, an hour counter, notably an hour counter performing one revolution every 24 hours.
6. The horological mechanism as defined in one of the preceding points, wherein the epicycloidal train comprises an input planetary wheel-holder of the epicycloidal train arranged so as to be driven by meshing, directly or indirectly, by a driving mobile.
7. The horological mechanism as defined in one of the preceding points, wherein the epicycloidal train is of type 4 and/or wherein the epicycloidal train comprises a planetary wheel comprising a first intermediate wheel meshing with a pinion of the first sun wheel and a second intermediate wheel meshing with the second sun wheel.
8. The horological mechanism as defined in one of the preceding points, wherein the planetary wheel-holder consists of a toothed wheel comprising a plate on which the planetary wheel gear is pivoted.

9. The horological mechanism as defined in one of the preceding points, wherein the first and second sun wheels are arranged on either side of the planetary wheel-holder.

10. The horological mechanism as defined in one of the preceding points, wherein the mechanism, in particular the clutch device, comprises a driver finger driving the counting chain.

11. The horological mechanism as defined in one of the preceding points, wherein the counting chain is an hours counting chain and/or wherein the counting chain is a minutes counting chain, the hours counting elements and the minutes counting elements being linked kinematically, notably by meshing.

A timepiece according to the invention is defined by point 12 below.

12. A timepiece, notably a wristwatch, comprising a mechanism as defined in one of the preceding points.

A mounting method according to the invention is defined by point 13 below.

13. A method for mounting a mechanism or a timepiece, wherein it comprises the following steps:
   - a step of provision of a frame,
   - a step of mounting of a driving mobile on the frame,
   - a step of mounting of an hours counter on the frame, and
   - a step of mounting:
     - of a mobile meshing with the driving mobile and with the hours mobile, or
     - of an epicycloidal train meshing with the driving mobile and with the hours mobile.

Different ways of executing the mounting method are defined by points 14 and 15 below.

14. The mounting method as defined in the preceding point, wherein the step of mounting of the mobile comprises the mounting of a boss in which the mobile is pivoted.

15. The mounting method as defined in point 13, wherein the step of mounting of the epicycloidal train comprises the fixing to the frame of a first sun wheel of the epicycloidal train.

The attached drawings represent, by way of example, an embodiment of a timepiece.

Figure 1:
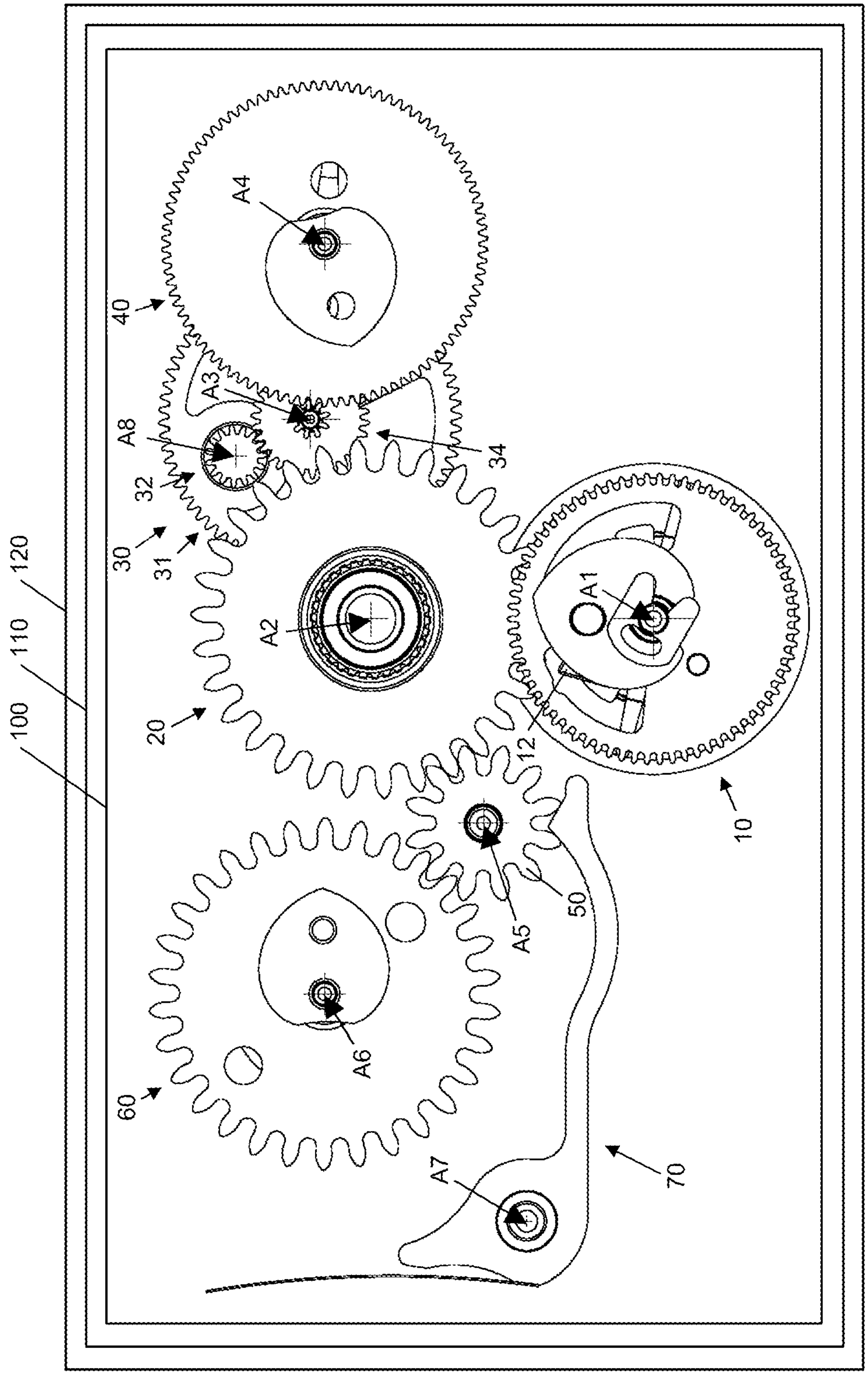
FIG. 1 is a top view of an embodiment of a timepiece.
Figure 2:
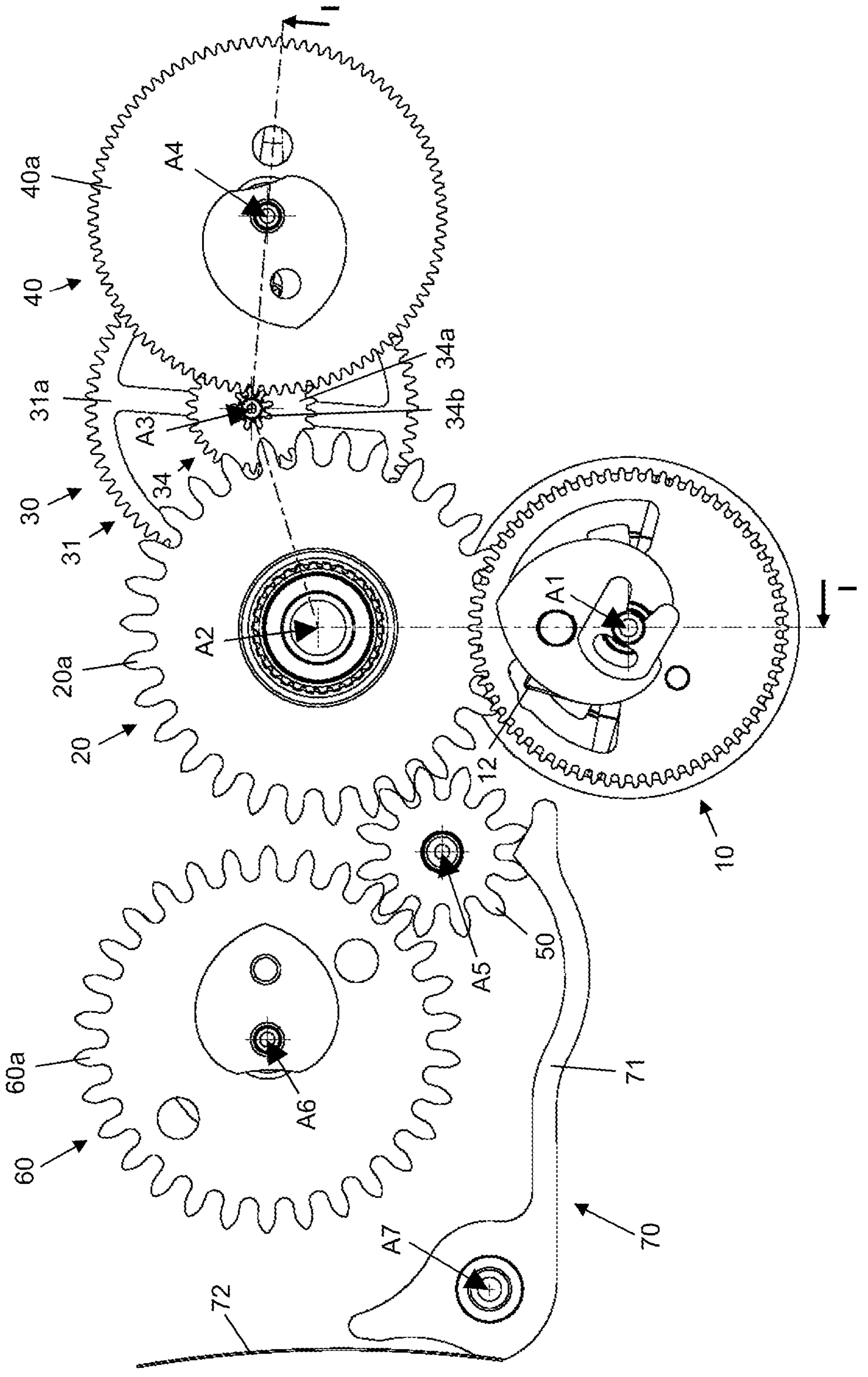
FIG. 2 is a top view of a first embodiment of a mechanism with counting chain.
Figure 3:
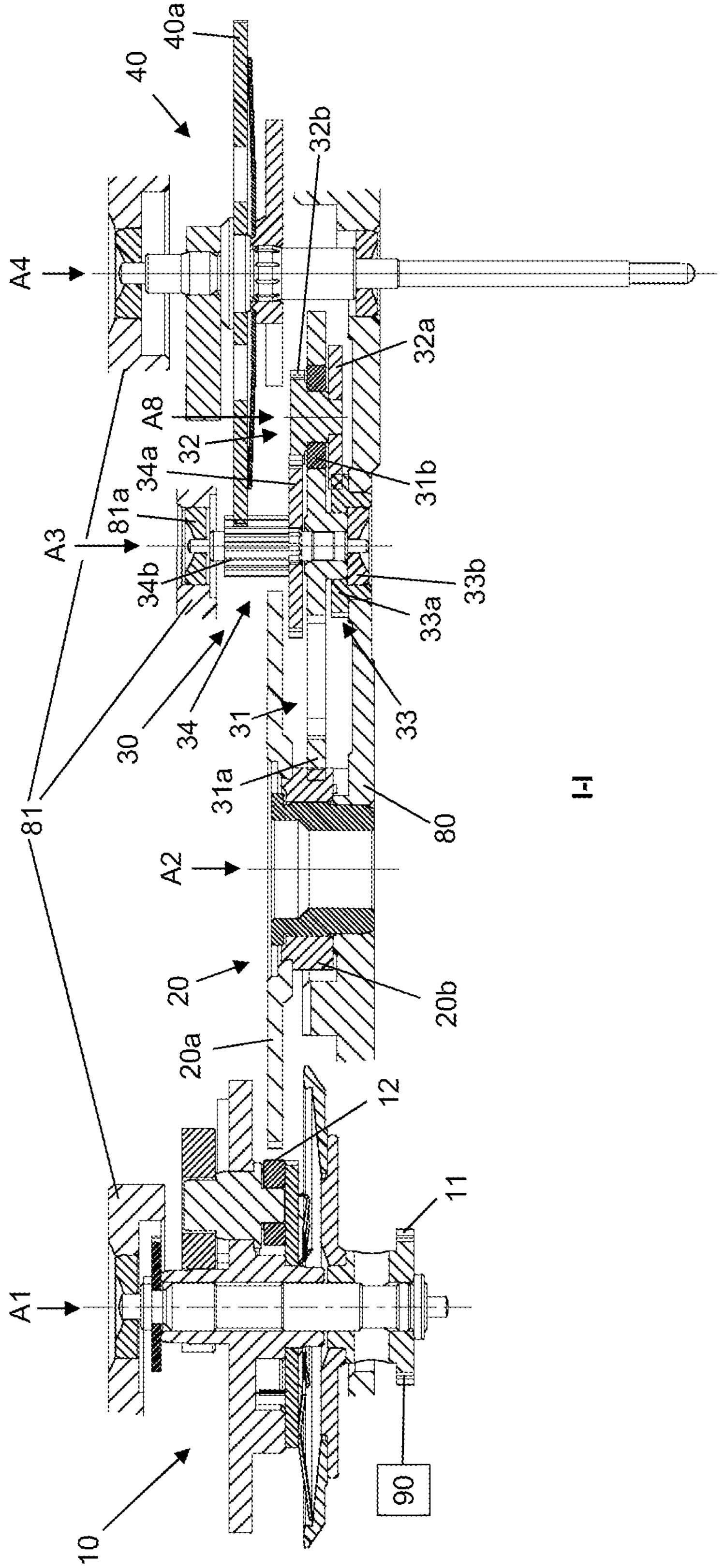
FIG. 3 is a foldout cross-sectional view along the line I-I of FIG. 2.

An embodiment of a timepiece 120 is described hereinbelow with reference to FIGS. 1, 2, 3, 6 and 7.

The timepiece 120 is, for example, a watch, in particular a wristwatch.

The timepiece 120 comprises a horological mechanism 110. The horological mechanism can be a horological movement intended to be mounted in a timepiece case in order to protect it from the external environment.

The horological movement 110 can be an electronic movement or a mechanical movement, notably an automatic movement.

Alternatively, the horological mechanism 110 can be included in the horological movement. Notably, the horological mechanism can be a chronograph module.

The horological mechanism 110 comprises:
- a frame 80, 81, and
- a counting chain 100 comprising an epicycloidal train 31, 32, 33, 34 including a first sun wheel 33 fixed to the frame.

The counting chain preferably comprises the following elements:
- a driving mobile 20 comprising a wheel 20*a* and a pinion 20*b* of the driving mobile, pivoting about an axis A2,
- a minutes counting mobile 50 in the form of an intermediate wheel 50, pivoting about an axis A5,
- a minutes counter 60 notably comprising a wheel 60*a* of the minutes counter, pivoting about an axis A6,
- a first portion of the epicycloidal train in the form of a pinion 33*a* of the first sun wheel 33,
- a second portion of the epicycloidal train in the form of an hours counting mobile 30 comprising:
- a planetary wheel-holder 31 comprising a wheel 31*a,*
- a planetary wheel 32 comprising a first and a second intermediate wheel, respectively 32*a* and 32*b,*
- a second sun wheel 34 comprising a wheel 34*a* and a pinion 34*b,*
- an hours counter 40 notably comprising a wheel 40*a* of the hours counter, pivoting about an axis A4,
- an indexing device 70 for example in the form of a jumper,
- a first frame element 80, and
- a second frame element 81.

The counting chain is advantageously an hours counting chain. The counting chain can, additionally, be a minutes counting chain. In this case, the hours counting elements and the minutes counting elements are advantageously linked kinematically, notably by meshing.

The first and second sun wheels 33, 34, and the planetary wheel-holder 31, are coaxial on an axis A3. The planetary wheel 32 pivots in the planetary wheel-holder 31 on an axis A8 parallel or substantially parallel to the axis A3.

The planetary wheel-holder 31 preferably constitutes the movement input of the epicycloidal train. The second sun wheel 34 preferably constitutes the movement output of the epicycloidal train. The epicycloidal train is preferably of type 4, which means that the first sun wheel comprises outer toothing and the second sun wheel comprises outer toothing. The planetary wheel 32 can comprise a first intermediate wheel 32*a* meshing directly with the first sun wheel 33 and a second intermediate wheel 32*b* meshing directly with the second sun wheel.

Preferably, the planetary wheel-holder consists of a toothed wheel comprising a plate on which the planetary wheel is pivoted. More preferably, the first and second sun wheels are arranged on either side of the planetary wheel-holder, in particular of the plate of the toothed wheel constituting the planetary wheel-holder. More preferably, the intermediate wheels 32*a* and 32*b* are disposed on either side of the planetary wheel-holder.

The pinion 33*a* of the first sun wheel 33 is fixed relative to the first and second frame elements 80, 81. In particular, the first sun wheel is fixed to the frame regardless of the state (clutched, declutched) of the clutch device, that is to say regardless of the state (stopped, in motion) of the counting chain. The second sun wheel 34 is pivoted relative to the first and second frame elements 80, 81. The planetary wheel-holder 31 is, for its part, pivoted about the second sun wheel 34. The hours counting mobile 30 thus comprises a planetary wheel-holder 31, and a second sun wheel 34, the planetary wheel-holder and the second sun wheel being mobile in rotation with respect to one another.

The second sun wheel 34 is arranged so as to drive, by meshing, directly or indirectly, the hours counter 40, notably an hours counter performing one revolution every 24 hours. In the embodiment represented in FIGS. 1, 2 and 3, the second sun wheel 34 is arranged so as to directly drive, by meshing, the hours counter 40. Alternatively, the hours counter could be driven, by meshing, by the second sun wheel, via an intermediate element such as an intermediate wheel.

The counting chain is linked kinematically to a finishing gear train 90 of a horological movement through a clutch device comprising a clutch mobile 10. This clutch mobile 10 pivots about an axis A1. It notably comprises a clutch pinion 11 meshing with the finishing gear train and a retractable driver finger 12 provided to drive the counting chain 100 according to the state of the chronograph.

The clutch mobile 10 therefore makes it possible to mechanically link the finishing gear train 90 to the counting chain 100.

Preferably, the clutch mobile 10 takes the form of a vertical clutch mobile. "Vertical clutch mobile" is understood to mean a clutch mobile comprising a first element and a second element that are mobile in rotation about the axis A1 and that move with respect to one another by translation on the axis A1 to switch from a clutched state to a declutched state.

In other words, the clutch mobile 10 makes it possible to kinematically link the finishing gear train 90 to the chronograph counting chain based on its configuration, the latter being able to have two distinct states, clutched or declutched, according to the state of the chronograph, whether it is, respectively, on or off.

When the chronograph is on, the driver finger 12 drives the chronograph counting chain one step per minute. More particularly, the driver finger 12 actuates the wheel 20*a* of the driving mobile 20, which drives the intermediate wheel 50 of the minutes counting mobile, and the wheel 60*a* of the minutes counter 60.

In its rotation, the mobile 20 also drives the hours counting mobile 30. In the embodiment represented in FIGS. 1, 2 and 3, the mobile 20 is arranged so as to directly drive, by meshing, the planetary wheel-holder 31. More particularly, the pinion 20*b* of the mobile 20 drives the wheel 31*a* of the planetary wheel-holder 31 and therefore the planetary wheel 32 pivoted in the planetary wheel-holder 31 on the axis A8 parallel or substantially parallel to the axis A3. Alternatively, the planetary wheel-holder 31 could be driven, by meshing, by the mobile 20, via an intermediate element such as an intermediate wheel.

Figure 6:
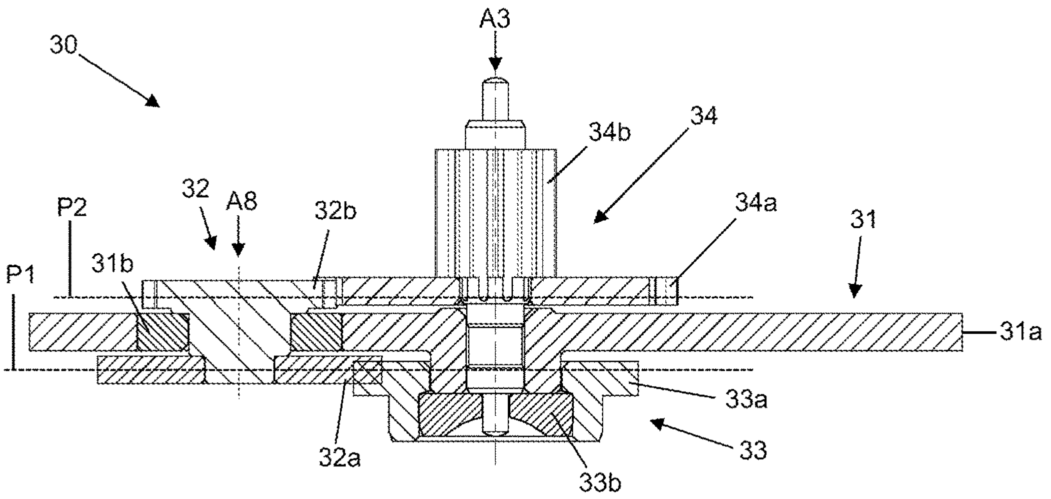
FIG. 6 is a detail cross-sectional view notably of a mobile of the first embodiment.
Figure 7:
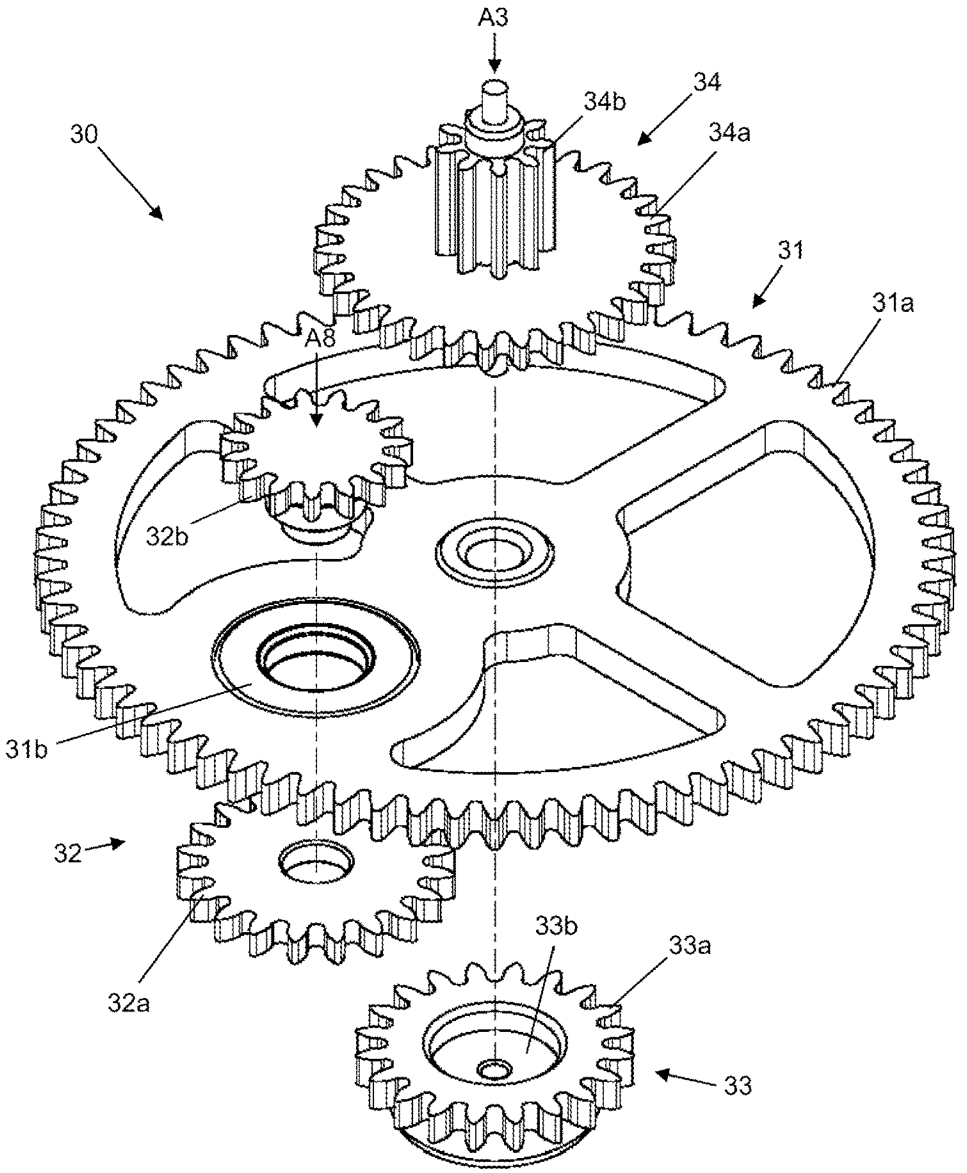
FIG. 7 is an exploded view notably of a mobile of the first embodiment.

The mobile 30 is illustrated in cross-section in FIG. 6 and by exploded view in FIG. 7. As described in references notably to these figures, the first intermediate wheel 32*a* of the planetary wheel 32 meshes with the pinion 33*a* of the first sun wheel 33 on a first level P1 or on a first plane P1. Thus, upon the rotation of the planetary wheel-holder 31, the planetary wheel 32 revolves about the axis A3 and revolves also on itself about the axis A8. The second intermediate wheel 32*b* of the planetary wheel 32 is secured in rotation to the first intermediate wheel 32*a*. The second intermediate wheel 32*b* is arranged on a second level P2 or on a second plane P2 and meshes with the wheel 34*a* of the second sun wheel 34. The pinion 34*b*, secured in rotation to the wheel 34*a*, then drives the wheel 40*a* of the hours counter 40.

The second sun wheel 34 is for example pivoted by jewels arranged on the axis A3. The first jewel 33*b* is mounted in the first sun wheel 33 fixed to the first frame element 80. The second jewel 81*a* is fixed to the second frame element 81. The planetary wheel-holder, for its part, pivots about a portion of the second sun wheel 34, more particularly about a portion of the pinion 34*b* of the second sun wheel 34. The planetary wheel 32 pivots on the axis A8, preferably in a jewel 31*b* fixed to the planetary wheel-holder 31.

Advantageously, all of the counting chain, more particularly the minutes counter 60 and the hours counter 40, are indexed by a single indexing device 70. This indexing device 70 comprises, for example, a lever 71 intended to cooperate with the toothing of the intermediate wheel 50 included in the chain kinematically linking the minutes counter 60 and the hours counter 40. The return of the lever 71 is ensured by an elastic return element 72, a first end of which is fixed to the lever 71 and a second end of which is provided to cooperate with the first frame element 80 of the movement.

The hours counting mobile 30, in the form of a portion of epicycloidal train, advantageously allows a greater reduction ratio to be generated in the chronograph counting chain, thus making it possible to obtain, for example, a display of the hours counter 40 over 24 hours instead of 12 hours. The bulk resulting from the arrangement of this epicycloidal train remains the same or substantially the same as that of a mobile comprising just one axis of rotation with a pinion and a wheel as described hereinbelow with reference to FIGS. 4 and 5.

Figure 4:
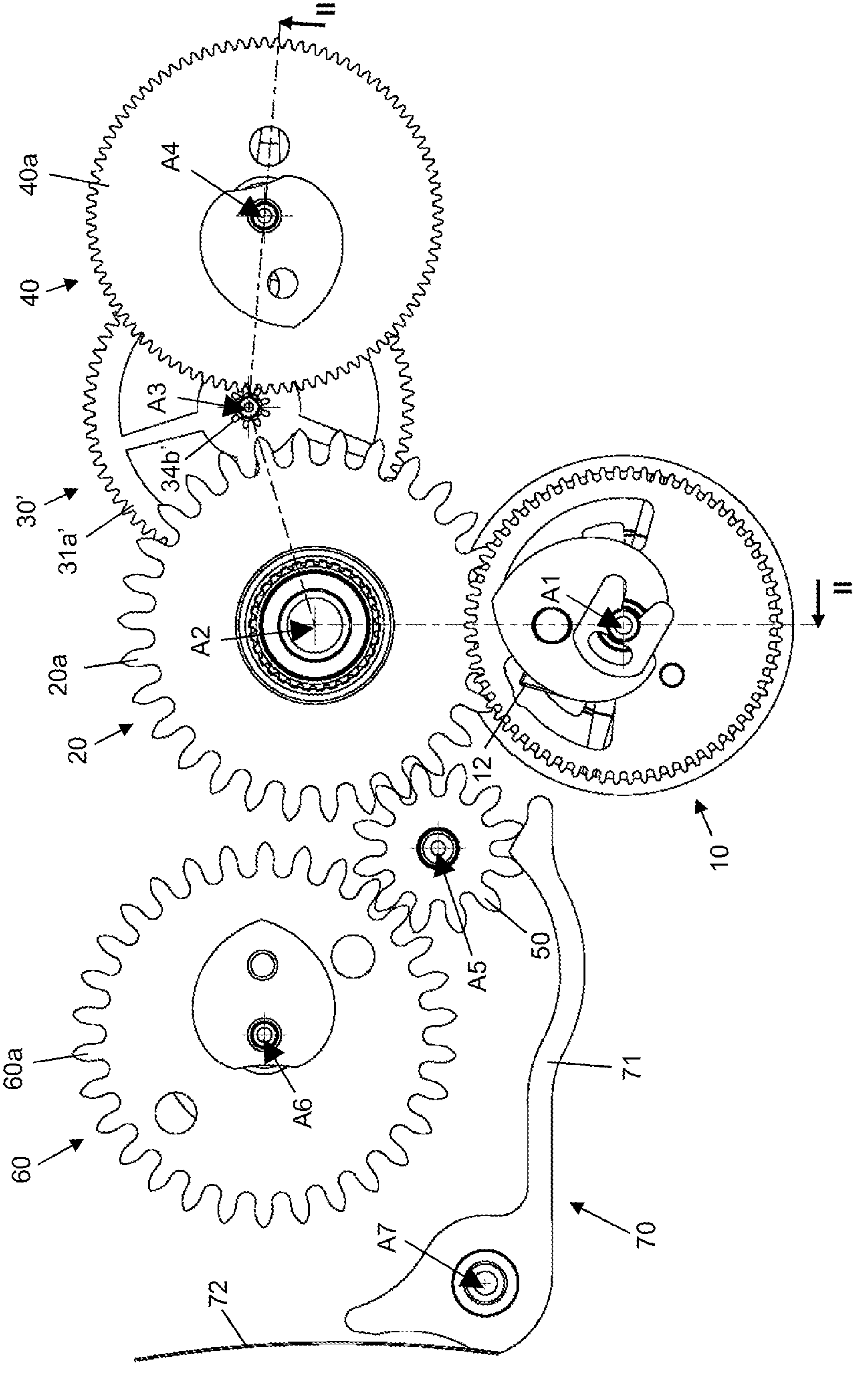
FIG. 4 is a top view of a second embodiment of a mechanism with counting chain.
Figure 5:
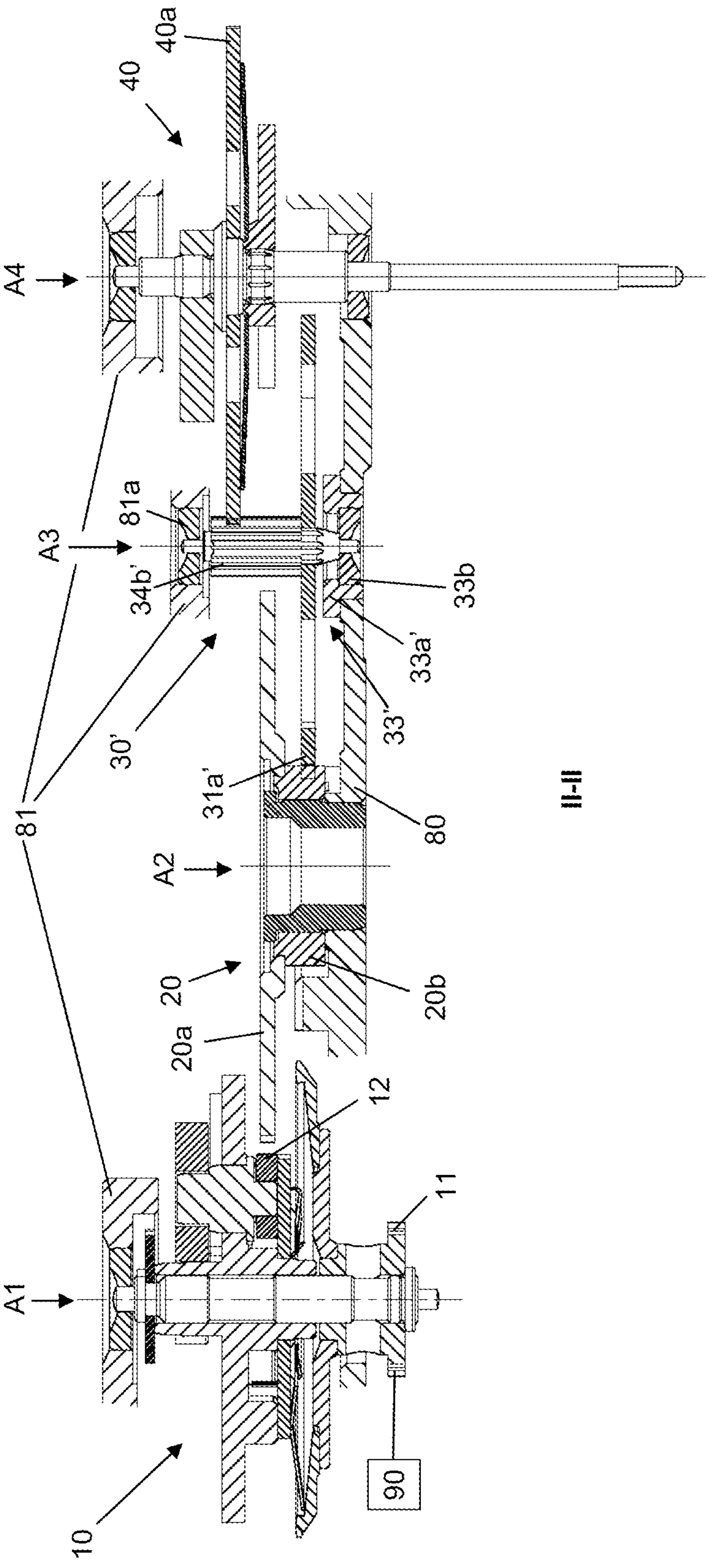
FIG. 5 is a foldout cross-sectional view along the line II-II of FIG. 4.

In a second embodiment represented in FIGS. 4 and 5, the counting chain differs from the first counting chain embodiment only in that the mobile 30 pivoted about the axis A3 is replaced by an hours counting mobile 30' comprising only a wheel 31*a'* and a pinion 34*b'*. The wheel 31*a'* and the pinion 34*b'* are secured to one another. The wheel 31*a'* meshes with the mobile 20, notably with the pinion 20*b* of the mobile 20. The pinion 34*b'*, for its part, meshes with the counter 40, notably with the wheel 40*a* of the counter 40.

Furthermore, the second counting chain embodiment can also differ from the first counting chain embodiment in that the first sun wheel 33 is replaced by a boss 33'. In fact, since the pinion 33*a* of the first sun wheel 33 fixed to the first frame element 80 of the horological movement is no longer of any use here, it can be replaced by a boss 33*a'* also fixed to the first frame element 80 of the horological movement.

In comparing the two counting chains with and without epicycloidal train described with reference to the figures, it can be seen that the bulk required for the implementation of the two hours counting mobile variants 30 and 30' is identical or substantially identical. It is thus possible to obtain a common counting chain architecture that can, for example, present a display of the hours counter over 12 hours without epicycloidal train and for example a display of the hours counter over 24 hours by replacing simply the mobile 30' by the mobile 30 and the boss 33*a'* by the pinion 33*a*. It should be noted that the sun wheel 33, in particular the first jewel 33*b* mounted in the first sun wheel 33, can allow both the pivoting of the mobile 30 and the mobile 30'. Alternatively, the first jewel 33*b* can be added directly in the first frame element 80.

Thus, the invention relates also to a method for mounting a mechanism or a timepiece, a method of execution of which is described hereinbelow with reference to the figures.

The mounting method comprises the following steps:

a step of provision of a frame 80, 81, a step of mounting of a driving mobile 20 on the frame 80, 81, a step of mounting of an hours counter 40 on the frame 80, 81, and a step of mounting:

of a mobile 30' meshing with the driving mobile and with the hours mobile, or of an epicycloidal train 31, 32, 33, 34 meshing with the driving mobile and with the hours mobile.

The above formulation should not be interpreted as characterizing two alternative mounting methods, but as a single mounting method in which, by using notably one and the same frame, one and the same driving mobile and one and the same hours mobile, it is possible to obtain two distinct mechanisms depending on whether an epicycloidal train or a mobile comprising only a pinion and a wheel is used. It is in particular possible to obtain a mechanism as described with reference to FIGS. 2 and 3 or a mechanism as described with reference to FIGS. 4 and 5.

In particular, the step of mounting of the mobile 30' can comprise the mounting of the boss 33' in which the mobile is pivoted. Alternatively, the step of mounting of the mobile 30' can comprise the mounting of the first sun wheel 33 in which the mobile 30' is pivoted.

In particular, the step of mounting of the epicycloidal train 31, 32, 33, 34 can comprise the fixing to the frame of the first sun wheel 33 of the epicycloidal train.

The epicycloidal train solution described above comprises a first sun wheel fixed to the frame of the horological movement. This solution could operate similarly if the part of the epicycloidal train fixed to the frame were the second sun wheel. The epicycloidal train could also be driven by one of the sun wheels instead of being driven by the planetary wheel-holder.

Whatever the embodiment or variant, the construction of the epicycloidal train could be different. The epicycloidal train could comprise an internal toothing, for example on at least one of the sun wheels and/or the planetary wheel-holder.

Whatever the embodiment or variant, the epicycloidal train could also be of spherical type with, for example, conical toothings on the sun wheels and/or the planetary wheel or wheels. The rotation axis or axes of the planetary wheel or wheels would then be at right angles or substantially at right angles to the axis A3 of the epicycloidal train.

Whatever the embodiment or variant, the epicycloidal train could be of ball differential type and operate by friction by replacing the planetary wheel or wheels of the planetary wheel-holder by balls.

Whatever the embodiment or variant, the epicycloidal train could also comprise several planetary wheels disposed on different axes. These planetary wheels could be mounted between the two sun wheels in parallel and/or in series.

These solutions can of course operate for all transmission ratios within the epicycloidal train.

In the solutions described above, the counting chain can advance by one step every minute under the action of a driving finger of a clutch device. However, whatever the embodiment or variant, the driving of the counting chain could also be done continuously, without jumps, in dragging or semi-dragging fashion.

In the solutions described above, the clutch mobile is bypass-mounted with respect to the finishing chain. In an alternative construction, the chronograph clutch mobile could be arranged directly in the finishing gear train chain linking the barrel to the regulating organ.

In the solutions described above, the clutch device comprises a vertical clutch mobile. The clutch device could also take other forms such as, for example, a horizontal clutch device or an oscillating pinion. The chronograph counting chain could also be linked directly to the barrel, for example. In this specific case, the clutch device could then take the form of a friction device.

In order for the hours counting mobile 30 to be interchangeable with the hours counting mobile 30', the wheel 31*a* of the planetary wheel-holder comprises the same number of teeth as the wheel 31*a'* of the hours counting mobile. Similarly, the pinion 34*b* of the second sun wheel comprises the same number of teeth as the pinion 34*b'* of the hours counting mobile. That does not however represent a limitation of the design. The construction could in fact be implemented according to other toothing and/or assembly configurations.

In the solutions described above, the counting chain is an hours counting chain. However, more generally, the gear of epicycloidal train type could be used in any other counting chain comprising, for example, a seconds counter, a minutes counter, or a countdown chain.

Throughout this document, “two secured elements” is understood to mean that two elements are fixed to one another. In other words, it is understood that there is a link of embedment or a complete link between them.

Preferably, a “counting chain” is understood to mean a kinematic chain connected or connectable to the finishing gear train of the timepiece. Preferably, a counting chain is a kinematic chain that is not under stress.

By virtue of the invention, an epicycloidal train is advantageously arranged in a counting chain. It makes it possible to obtain a “24-hour” chronograph display instead of the “12-hour” display, with a solution that is particularly simple and of little bulk, to the extent that it is possible to simply replace one of the mobiles of the chronograph counting chain, and possibly a boss, with this epicycloidal train to switch from a “12-hour” display to a “24-hour” display.

The particular feature of the solution proposed here is that one of the sun wheels of the epicycloidal train is fixed to the frame.

The invention claimed is:

1. A horological mechanism comprising:

a frame, and a counting chain comprising an epicycloidal train including a planetary wheel gear and a first sun wheel, wherein the first sun wheel is fixed to the frame regardless of a stopped state or in-motion state of the counting chain, wherein the counting chain is linked kinematically to another counting chain.

2. The horological mechanism as claimed in claim 1, wherein the mechanism comprises a clutch device arranged upstream of the counting chain to mechanically link a finishing gear train to the counting chain.

3. The horological mechanism as claimed in claim 2, wherein the clutch device comprises a vertical clutch mobile.

4. The horological mechanism as claimed in claim 1, wherein the epicycloidal train comprises a second sun wheel which is an output sun wheel of the epicycloidal train arranged so as to drive, by meshing, directly or indirectly, a counter of the counting chain.

5. The horological mechanism as claimed in claim 4, wherein the second sun wheel is arranged so as to drive, by meshing, directly or indirectly, an hour counter.

6. The horological mechanism as claimed in claim 1, wherein the epicycloidal train comprises a planetary wheel-holder which is an input planetary wheel-holder of the epicycloidal train arranged so as to be driven by meshing, directly or indirectly, by a driving mobile.

7. The horological mechanism as claimed in claim 1, wherein at least one of the following:

the epicycloidal train is of type 4, the epicycloidal train comprises a second sun wheel which is an output sun wheel of the epicycloidal train arranged so as to drive, by meshing, directly or indirectly, a counter of the counting chain, and the epicycloidal train comprises a planetary wheel comprising a first intermediate wheel meshing with a pinion of the first sun wheel and a second intermediate wheel meshing with the second sun wheel.

8. The horological mechanism as claimed in claim 1, wherein the epicycloidal train comprises:

a planetary wheel-holder which is an input planetary wheel-holder of the epicycloidal train arranged so as to be driven by meshing, directly or indirectly, by a driving mobile, and a second sun wheel which is an output sun wheel of the epicycloidal train arranged so as to drive, by meshing, directly or indirectly, a counter of the counting chain, wherein the planetary wheel-holder comprises a toothed wheel comprising a plate on which the planetary wheel gear is pivoted.

9. The horological mechanism as claimed in claim 8, wherein the first and second sun wheels are arranged on either side of the planetary wheel-holder.

10. The horological mechanism as claimed in claim 1, wherein the mechanism comprises a driver finger driving the counting chain.

11. The horological mechanism as claimed in claim 1, wherein the counting chain is an hours counting chain comprising hours counting elements.

12. A timepiece comprising the horological mechanism as claimed in claim 1.

13. A method for mounting a mechanism or a timepiece, wherein the method comprises:

providing a frame, mounting a driving mobile on the frame, mounting an hours counter on the frame, and mounting:

(i) a mobile meshing with the driving mobile and with the hours counter, or (ii) an epicycloidal train meshing with the driving mobile and with the hours counter, the epicycloidal train including a planetary wheel gear and a first sun wheel, wherein the first sun wheel is fixed to the frame regardless of a stopped state or in-motion state of the hours counter, wherein the hours counter is linked kinematically to another counting chain.

14. The mounting method as claimed in claim 13, wherein the mounting of the mobile comprises mounting a boss in which the mobile is pivoted.

15. The mounting method as claimed in claim 13, wherein the mounting of the epicycloidal train comprises fixing a first sun wheel of the epicycloidal train to the frame.

16. The horological mechanism as claimed in claim 1, wherein the horological mechanism is a horological movement or chronograph module.

17. The horological mechanism as claimed in claim 5, wherein the hour counter is an hour counter performing one revolution every 24 hours.

18. The horological mechanism as claimed in claim 8, wherein the planetary wheel-holder consists of the toothed wheel comprising the plate on which the planetary wheel gear is pivoted.

19. The horological mechanism as claimed in claim 10, wherein the horological mechanism comprises a clutch device comprising the driver finger driving the counting chain.

20. The horological mechanism as claimed in claim 1, wherein the counting chain is an hours counting chain comprising hours counting elements and the other counting chain is a minutes counting chain comprising minutes counting elements, the minutes counting elements of the minutes counting chain being linked kinematically by meshing with the hours counting elements of the hours counting chain.

21. A horological mechanism comprising:

a frame, and a counting chain comprising an epicycloidal train including a planetary wheel gear and a first sun wheel, wherein the first sun wheel is fixed to the frame, wherein the clutch device comprises a vertical clutch mobile.

22. A horological mechanism comprising:

a frame, and a counting chain comprising an epicycloidal train including a planetary wheel gear and a first sun wheel, wherein the first sun wheel is fixed to the frame, wherein the epicycloidal train comprises a second sun wheel which is an output sun wheel of the epicycloidal train arranged so as to drive, by meshing, directly or indirectly, a counter of the counting chain, wherein the second sun wheel is arranged so as to drive, by meshing, directly or indirectly, an hour counter, wherein the hour counter is an hour counter performing one revolution every 24 hours.

23. A horological mechanism comprising:

a frame, and a counting chain comprising an epicycloidal train including a planetary wheel gear and a first sun wheel, wherein the first sun wheel is fixed to the frame, wherein the mechanism comprises a driver finger driving the counting chain, wherein the horological mechanism comprises a clutch device comprising the driver finger driving the counting chain.

* * * * *